(12) United States Patent
Gava et al.

(10) Patent No.: US 7,584,482 B2
(45) Date of Patent: Sep. 1, 2009

(54) SYSTEM AND METHOD FOR AUTHENTICATING TRANSACTIONS

(75) Inventors: Fabio M. Gava, Ladera Ranch, CA (US); Mohammad Suleiman, Trabuco Canyon, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 906 days.

(21) Appl. No.: 11/064,474

(22) Filed: Feb. 23, 2005

(65) Prior Publication Data

US 2006/0190411 A1 Aug. 24, 2006

(51) Int. Cl.
*G06F 17/30* (2006.01)
*H04L 9/32* (2006.01)
*G06F 7/04* (2006.01)
*G06F 12/14* (2006.01)

(52) U.S. Cl. .............................. 725/4; 726/21; 726/35; 380/258; 705/64

(58) Field of Classification Search .................... 726/4, 726/21, 35; 380/258; 705/64
See application file for complete search history.

(56) References Cited

U.S. PATENT DOCUMENTS

| | | | |
|---|---|---|---|
| 5,455,953 A * | 10/1995 | Russell | 710/266 |
| 5,638,283 A * | 6/1997 | Herbert | 705/410 |
| 6,948,656 B2 * | 9/2005 | Williams | 235/380 |
| 7,203,967 B2 * | 4/2007 | Chmaytelli et al. | 726/30 |
| 7,295,556 B2 * | 11/2007 | Roese et al. | 370/395.3 |
| 2003/0014368 A1 * | 1/2003 | Leurig et al. | 705/64 |
| 2003/0135463 A1 * | 7/2003 | Brown et al. | 705/44 |
| 2003/0159066 A1 * | 8/2003 | Staw et al. | 713/201 |
| 2005/0071295 A1 * | 3/2005 | Cordery et al. | 705/405 |

OTHER PUBLICATIONS

Willner, Alexander. "Secure location verification and determination", Oct. 2004.*

* cited by examiner

*Primary Examiner*—Michael J Simitoski
(74) *Attorney, Agent, or Firm*—Tucker Ellis & West LLP

(57) ABSTRACT

A system and method for authenticating document processing transactions wherein the transaction is rejected if the user is not within a selected geographical region. A transaction request is first received representing a request for the completion of a selected transaction associated with a selected user. Preauthorized geographic region data, associated with the selected user, is then received indicating from where the associated user is allowed to request transactions. Location data representing the source of the transaction request is then received and tested against the preauthorized geographic region data. The result of this testing determines whether the requested transaction is authorized.

17 Claims, 2 Drawing Sheets

SYSTEM AND METHOD FOR AUTHENTICATING TRANSACTIONS

BACKGROUND OF THE INVENTION

This invention is directed to a system and method for authenticating transactions. More particularly, this invention is directed to a system and method for authenticating transactions, particularly document processing transactions, from an associated user based on the location of the user.

Document processing services are often provided in non-office or public environments, such as airports, hotels, or retail establishments, to propagate or generate electronic documents. Users of such document processing services access the services by various means known in the art. For example, user may access a document processing device to perform document processing operations directly via a key card and magnetic read associated with a document processing device or a user interface wherein the user inputs required user identification data. The user may also access a document processing device via a computer or other suitable interface via a suitable communication link.

These document processing services are often offered at many different locations throughout a city, state, region, or other geographical area. The more locations or areas in which a provider of such services offers their services, the more likely it is for such services to be accessed by an unauthorized user. Currently providers of such services are not able to prohibit access to its services based on the location of the user. Therefore, if a user were only able to access the services when the user was in a defined geographical area, this would reduce the number of locations or area in which an unauthorized user could access the services. For example, if a user which has rights to use document processing services in California were to have his key card or other means for accessing the services stolen or copied, the service provider would only be subject to unauthorized usage from a recipient of such key card or access means within the state of California, rather than the all the locations or regions in which the service provider offers its services. The service provider would then only have to monitor for unauthorized usage in the geographic area in which usage of the services was allowed.

There is a need for a system and method for authenticating transactions, particularly document processing transactions, from an associated user based on the location of the user.

SUMMARY OF THE INVENTION

In accordance with the present invention, there is provided a system and method for authenticating transactions.

Further, in accordance with the present invention, there is provided a system and method for authenticating document processing transactions based on the location of the user.

Still further, in accordance with the present invention, there is provided a system and method for authenticating document processing transactions wherein the transaction is rejected if the user is not within a selected geographical area.

Still further, in accordance with the present invention, there is provided a system for authenticating transactions. The system includes receiving means adapted to receive a transaction request associated with a selected user. Region data receiving means are then used to receive a preauthorized geographic region within which the associated user is allowed to request transactions. Location receiving means are employed to receive location information corresponding to the source from which the transaction request is sent. Testing means adapted for testing the region data against the location data are used to determine if the source of the request falls within the preauthorized geographic region. Generating means adapted for generating authorization data representing the output of the testing means is used to authorize or deny the requested transaction.

Preferably, the transaction request data is received from an associated document processing device. The document processing device includes a printing device, a copying device, a facsimile device, a scanning device, and a multifunctional peripheral device.

In a preferred embodiment, the transaction request data includes data representing a requested document processing operation, such as printing, scanning, faxing, copying, and document distribution.

In another embodiment, the transaction request data further includes identification data representing the identity of the selected user.

In yet another embodiment, the system further comprises generating means adapted to generate interface data so as to prompt input of the location data from a selected user.

Still further, in accordance with the present invention, there is provided a method for authenticating transactions. The method begins with the receipt of a transaction request representing a request for the completion of a selected transaction associated with a selected user. Preauthorized geographic region data, associated with the selected user, is then received indicating from where the associated user is allowed to request transactions. Location data representing the source of the transaction request is then received and tested against the preauthorized geographic region data, resulting in the generation of authorization data enabling the transaction request to be fulfilled.

Preferably, the transaction request data is received from an associated document processing device, such as a printing device, a copying device, a facsimile device, a scanning device, and a multifunctional peripheral device.

In a preferred embodiment, the transaction request data includes data representing a requested document processing operation. The requested document processing operation is one of printing, scanning, faxing, copying, and document distribution.

In another embodiment, the transaction request data further includes identification data representing the identity of the selected user.

Preferably, the method further comprises the step of generating interface data so as to prompt input of the location data from a selected user.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description, serve to explain the principles of the invention.

DETAILED DESCRIPTION OF THE PREFERRED EMBODIMENT

Figure 1:
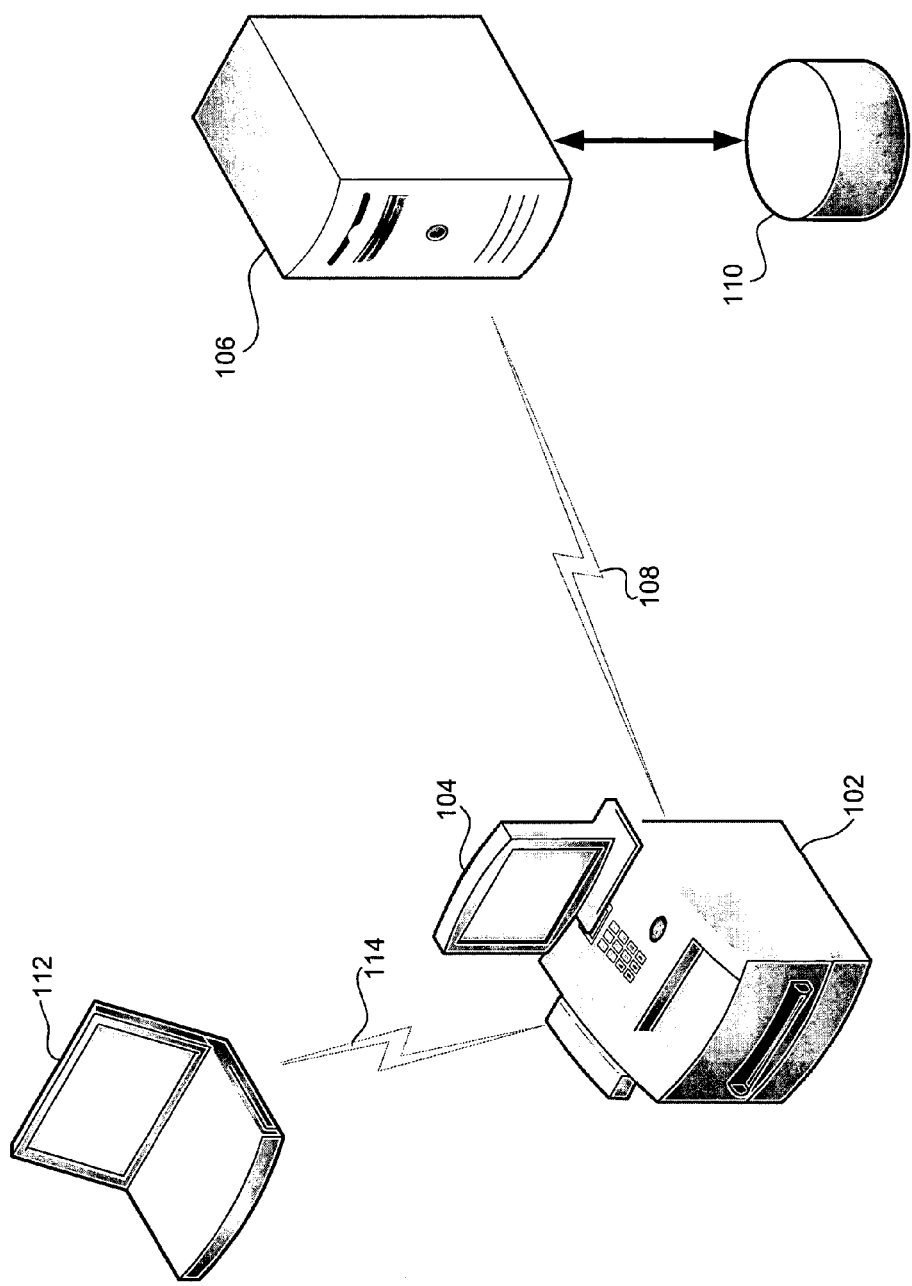
FIG. 1 is a block diagram illustrating a system in accordance with the present invention.

The present invention is directed to a system and method for authenticating transactions based on the location of the user. More particularly, the present invention is directed to a system and method for authenticating document processing transactions wherein the transaction is rejected if the user is not within a selected geographical region. Turning now to FIG. 1, there is illustrated a block diagram of a system 100 in accordance with the present invention. As shown in FIG. 1, the system 100 suitably includes one or more service location providers, such as document processing providers, as illustrated by the multifunction peripheral device 102, which suitably is adapted to receive and process document processing transactions. It will be appreciated by those skilled in the art that the document processing device is any suitable document processing device known in the art, such as a copier, printer, scanner, facsimile and the like, or any combination thereof. Suitable commercially available document processing peripherals include, but are not limited to, the Toshiba e-Studio Series Controller.

As illustrated in FIG. 1, the multifunction peripheral device 102 suitably includes an associated user interface 104. In the preferred embodiment, the user interface 104 is a touch screen display, capable of both displaying data to a user, as well as receiving user input. It will be understood by those skilled in the art that any suitable user interface known in the art, including, but not limited to an alphanumeric keypad, an LCD, and the like, are equally capable of being employed by the present invention. While illustrated in FIG. 1 as physically coupled to the multifunction peripheral device 102, the user interface 104 is capable of being implemented as a separate component from the device 102. For example, the user interface 104 is suitably capable of being implemented as a distinct electronic device (not shown) in wired or wireless data communication with the multifunction peripheral device 102, a web browser, a web portal, and the like. The multifunction peripheral device 102 is in data communication with an authentication server 106 via a suitable communications link 108. As will be understood by those skilled in the art, the communications link 108 is any suitably communications link known in the art, including, but not limited to LAN, the Internet, directly via 802.11g (WiFi), Bluetooth, or other 802.11(X) wireless communications channels.

The authentication server 106 is in data communication with at least one data storage device, shown in FIG. 1 as the user profile database 110, suitably adapted to store user identification information, a user profile, regional preauthorization data, location data, passwords, account information, and the like. The skilled artisan will appreciate that the database 110 is any mass storage device known in the art, including, without limitation, magnetic data storage, optical data storage, virtual data storage, flash memory, and the like. In accordance with the present invention, the regional preauthorization data suitably includes, for example and without limitation, a state, a city, or a number of miles around a zip code.

As will be understood by those skilled in the art, in accordance with the present invention, the database 110 is suitably accessible by a user via the authentication server 106, the multifunction peripheral device 102, and a remote user terminal, shown in FIG. 1 as laptop computer 112. The skilled artisan will appreciate that while the user terminal is illustrated as the laptop computer 112, any suitable portable electronic device adapted to communicate with the multifunction peripheral device 102 is equally capable of being used in the present invention, including, without limitation a smartphone, a PDA, a RIM device, or any web-enabled cellular telephone. Preferably, the user profile is entered into the database 110 via a suitable interface, such as a web browser, following authentication of the user. In addition, direct telephone contact via a customer service number, is also capable of updating or creating the user profile.

Further in accordance with the present invention, the laptop computer 112 suitably communicates with the multifunction peripheral device 102 via any suitable communications link 114. In the preferred embodiment, the multifunction peripheral device 102 is located at one of a plurality of services providers (not shown), and the laptop computer 112 is brought into data communication with the multifunction peripheral device via any means known in the art. A user, at the laptop computer 112, or via direct interaction with the user interface 104, communicates with the multifunction peripheral device 102 to facilitate document processing transactions. During this interaction, the user is prompted to enter identification data to the multifunction peripheral device 102. The input user identification data is then transmitted via communications link 108 to the authentication server 106.

The authentication server 106 accesses the user profile database 110 and retrieves preauthorized geographic region data corresponding to the user identification. The multifunction peripheral device 102 also transmits to the authentication server 106 source location data representing the current location of the multifunction peripheral device 102. Preferably, the user is in direct proximity to the multifunction peripheral device 102. In an alternate embodiment, the user, via the laptop computer 112, is within a predetermined radius of the multifunction peripheral device 102. In either event, the location data from the multifunction peripheral device 102 is compared with the preauthorized geographic region data stored on the database 110. When the location data falls within the preauthorized geographic region, the requested document processing operation is allowed and the multifunction peripheral device 102 carries out the document processing operation corresponding to the requested transaction. When the location data indicates the user is outside the preauthorized geographic region, the requested transaction is denied.

Figure 2:
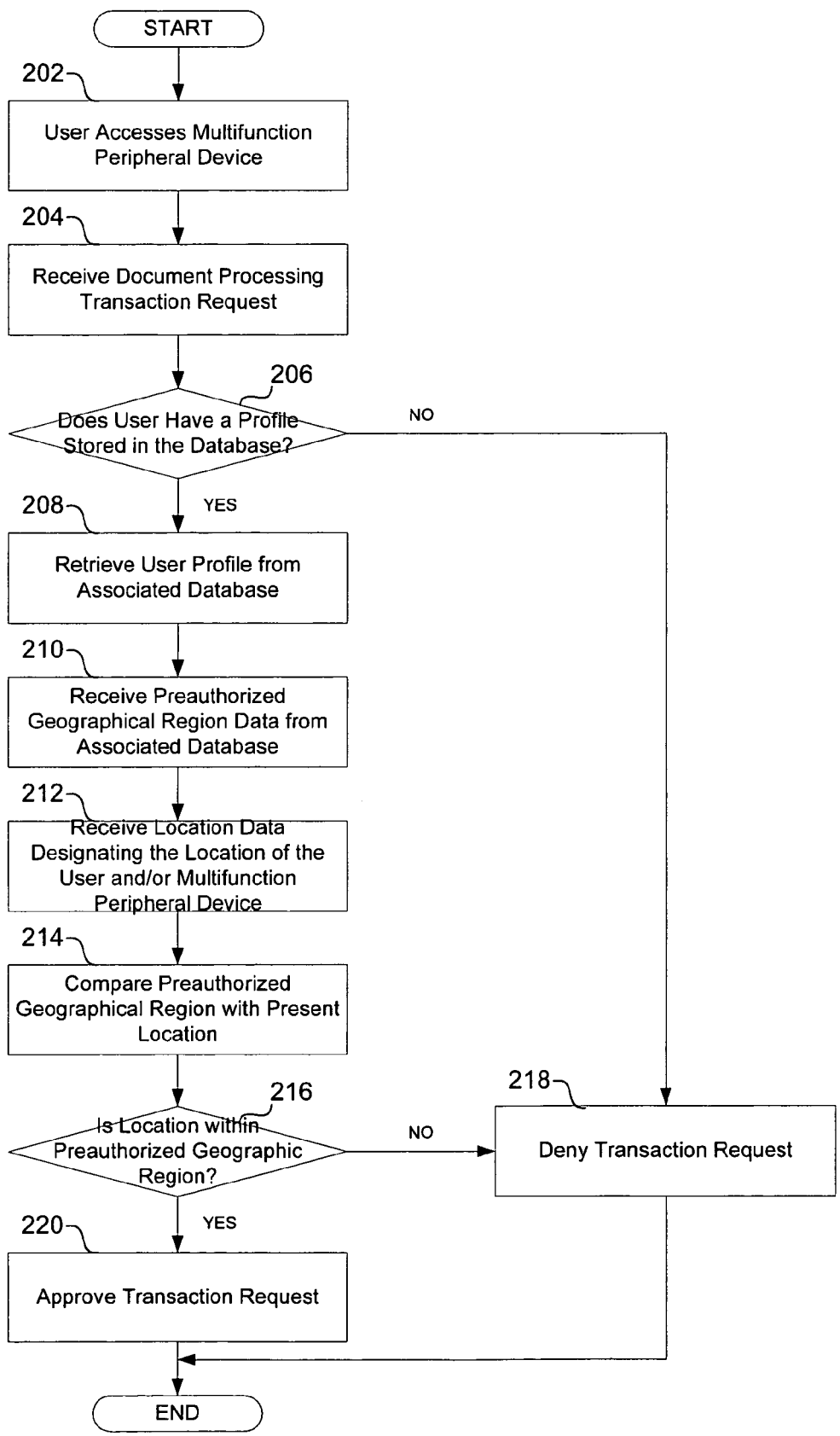
FIG. 2 is a flow chart illustrating a method in accordance with the present invention.

Turning now to FIG. 2, there is shown a flowchart 200 illustrating a method according to the present invention. Beginning at step 202, a user accesses the multifunction peripheral device 102 via any means known in the art. For example, the user accesses the multifunction peripheral device 102 directly via the user interface 104 or via the laptop computer 112 via the communications link 114. The authentication server 106 then receives a document processing transaction request from the multifunction peripheral device 102, e.g., a request to process one or more documents from the user, at step 204. In the preferred embodiment, the transaction request includes user identification information. A determination is made at step 206 whether the user identified by the user information has an existing user profile. When the user does not have a profile, the transaction request is denied at step 218 and the process terminates.

When the user has an existing profile, the authentication server 106 then retrieves the user profile from the database 110 corresponding to the user identification contained in the transaction request at step 208. At step 210, the authentication server 106 receives preauthorized geographical region data, from the database 110, representing the geographic region from which the user is authorized to request document processing services. The authentication server 106 then receives at step 212, location data representing the source of the transaction request, e.g., the location of the user, when in direct contact with the multifunction peripheral device 102, or alternatively, the location of the multifunction peripheral device 102 that has submitted the transaction request.

The preauthorized geographical region data is then compared with the received location data at step 214. A determination is made at step 216 whether the location of the user and/or the multifunction peripheral device 102 falls within the preauthorized geographical region. When the location is outside the preauthorized geographical region, the authentication server 106 transmits a denial to the multifunction peripheral device 102 and the transaction request is denied at step 218. When the location falls within the preauthorized geographical region, the authentication server 106 transmits an approval and the transaction request is approved at step 220.

The forgoing description describes an authentication server 106 separate from the multifunction peripheral device 102 that receives the document processing request. However, the skilled artisan will appreciate that the authentication server 106 is equally capable of being employed as software residing on the device 102 and the database 110 suitably coupled to the device 102. The preceding description has been provided for exemplification purposes only and is not intended to limit the present invention solely to a remote authentication server 106.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A transaction authentication system comprising:
    means adapted for receiving into a transaction device, from a remote user terminal, transaction request data representative of a request for completion of a selected transaction associated with a selected user, the transaction request data including identification data corresponding to the selected user;
    the transaction device including means adapted for communicating the identification data to an associated database, the database including means for receiving, from the user, data corresponding to user-customized, preauthorized geographic locations associated with the identification data;
    means adapted for receiving, from the database, region data representative of a preauthorized geographic region associated with the selected user, from which selected transactions are enabled;
    means adapted for receiving location data from the transaction device to an authentication server, which location data is representative of a source geographic region corresponding to the transaction device;
    testing means adapted for testing the region data against the location data; and
    means adapted for generating authorization data representative of an output of the test means.

2. The transaction authentication system of claim 1 further comprising means adapted for transmitting transaction request data to an associated document processing device.

3. The transaction authentication system of claim 2 wherein the associated document processing device includes at least one of a printing device, a copying device, a facsimile device, a scanning device, and a multifunctional peripheral device.

4. The transaction authentication system of claim 2 wherein the transaction request data includes data representative of a requested document processing operation on the associated document processing device.

5. The transaction authentication system of claim 4 wherein the requested document processing operation includes at least one of printing, scanning, faxing, copying, and document distribution.

6. The transaction authentication system of claim 4 further comprising means adapted for generating interface data so as to prompt input of the location data from a selected user.

7. A transaction authentication method comprising the steps of:
    receiving into a transaction device, from a remote user terminal, transaction request data representative of a request for completion of a selected transaction associated with a selected user, the transaction request data including identification data corresponding to the selected user;
    communicating the identification data from the transaction device to an associated database, the database including means for receiving, from the user, data corresponding to user-customized preauthorized geographic locations associated with the identification data;
    receiving, from the database, region data representative of a preauthorized geographic region associated with the selected user, from which selected transactions are enabled;
    receiving location data from the transaction device to an authentication server, which location data is representative of a source geographic region corresponding to the transaction device;
    testing the region data against the location data; and
    generating authorization data representative of an output of the testing.

8. The transaction authentication method of claim 7 further comprising transmitting the transaction request data to an associated document processing device.

9. The transaction authentication method of claim 8 wherein the associated document processing device includes at least one of a printing device, a copying device, a facsimile device, a scanning device, and a multifunctional peripheral device.

10. The transaction authentication method of claim 8 wherein the transaction request data includes data representative of a requested document processing operation on the associated document processing device.

11. The transaction authentication method of claim 10 wherein the requested document processing operation includes at least one of printing, scanning, faxing, copying, and document distribution.

12. The transaction authentication method of claim 10 further comprising the step of generating interface data so as to prompt input of the location data from a selected user.

13. A computer-implemented method for authenticating transactions comprising the steps of:

receiving into a transaction device, from a remote user terminal, transaction request data representative of a request for completion of a selected transaction associated with a selected user, the transaction request data including identification data corresponding to the selected user;

communicating the identification data from the transaction device to an associated database, the database including means for receiving, from the user, data corresponding to user-customized preauthorized geographic locations associated with the identification data;

receiving, from the database, region data representative of a preauthorized geographic region associated with the selected user, from which selected transactions are enabled;

receiving location data from the transaction device to an authentication server, which location data is representative of a source geographic region corresponding to the transaction device;

testing the region data against the location data; and generating authorization data representative of an output of the testing.

14. The computer-implemented method for authentication transactions of claim 13 further comprising transmitting the transaction request data to an associated document processing device.

15. The computer-implemented method for authentication transactions of claim 14 wherein the associated document processing device includes at least one of a printing device, a copying device, a facsimile device, a scanning device, and a multifunctional peripheral device.

16. The computer-implemented method for authentication transactions of claim 14 wherein the transaction request data includes data representative of a requested document processing operation on the associated document processing device.

17. The computer-implemented method for authentication transactions of claim 14 further comprising the step of generating interface data so as to prompt input of the location data from the selected user.

* * * * *